J. LEMMAN.
Chair-Seat.

No. 226,082       Patented Mar. 30, 1880.

WITNESSES
Franck L. Ouraud
Chas. A. Neale

INVENTOR
John Lemman
by his attorney

UNITED STATES PATENT OFFICE.

JOHN LEMMAN, OF WAKEFIELD, MASSACHUSETTS.

CHAIR-SEAT.

SPECIFICATION forming part of Letters Patent No. 226,082, dated March 30, 1880.

Application filed March 6, 1879.

*To all whom it may concern:*

Be it known that I, JOHN LEMMAN, of Wakefield, in the county of Middlesex and State of Massachusetts, have invented certain new and useful Improvements in Chair-Seats; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of this invention is to so construct cane bottoms for chairs and seats generally that while they retain a yielding character they will be rendered more durable and capable of resisting greater strain.

To this end the invention consists in providing the cane bottom with a backing of one or more layers of splints cut from the inner portion of the cane or from wood, and uniting the whole by means of glue or other cementing substance.

Figure 1:
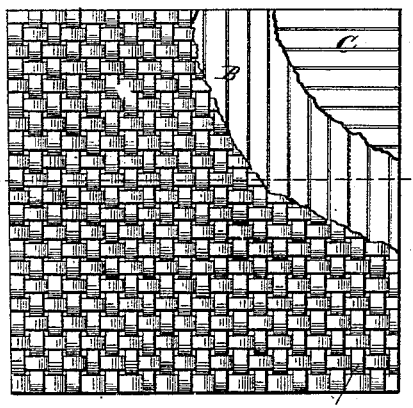
Figure 3:
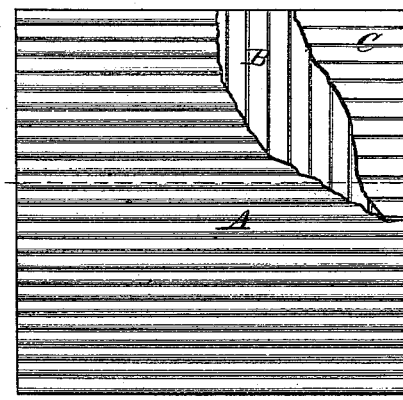
Figure 2:
Figure 4:

In the accompanying drawings, Figure 1 is a plan view, partly broken away, of a chair-seat blank composed of a surface of cane-cloth and a backing of two layers of splints. Fig. 2 is a section of the blank shown in Fig. 1. Fig. 3 is a plan of a chair-seat blank the upper layer of which is formed of unwoven splints. Fig. 4 is a section of the blank shown in Fig. 3.

The same letters of reference are used in all the figures in the designation of identical parts.

In making cane bottoms according to my invention, the inner portion of the cane may be utilized in its natural condition by cutting thin strips or splints therefrom and forming layers of them by placing them side by side, using one or more of such layers as the backing for the cane-cloth, which forms the upper surface, A, of the chair-bottom.

In Figs. 1 and 2 I have shown the cane-cloth A provided with two layers, B and C, of the backing, the splints of one layer running at right angles to the splints of the other layer, and the whole being united with glue to form a composite chair seat or bottom.

The cost of manufacture (where woven cane is used) will be but a slight advance upon cane bottoms as constructed at the present time, and the bottom will be much more durable.

In Figs. 3 and 4 I have shown another form of constructing cane bottoms for chairs, &c., according to my invention. In this instance, instead of using the cane-cloth for the upper surface or layer, A, of the seat, said upper layer is made of splints, not interwoven, but merely laid side by side, the outside or enamel part of the cane being used preferably.

A saving of material and expense would be effected by making bottoms in this way, instead of making the upper layer of cane-cloth, and that without material loss in point of strength and durability.

It will be seen that the composite seats or bottoms made according to my invention, whether woven or plain surfaced, though possessing greater body to resist wear than the ordinary cane bottoms, will retain their pliable or yielding character, and are, in this respect especially, unlike chair-bottoms formed of veneers, and form a much easier and more comfortable seat than the latter.

This composite material may be made in sheets of suitable sizes and shapes, and in that form sold to manufacturers, who can cut them to suit the shape of the chairs or other articles of furniture to be bottomed.

An inferior modification of my invention would be to use hickory or other wood splints, whether woven or plain, for the upper layer of splint chair-bottoms, such upper layer being combined with a backing layer or layers of either cane splints or wood splints.

What I claim as my invention, and desire to secure by Letters Patent, is—

1. A composite material for bottoms for chairs and other seats or articles of furniture, composed of layers of splints glued or cemented together, substantially as before set forth.

2. A composite material for bottoms for chairs and other seats or articles of furniture, composed of layers of splints glued or cemented together, the top layer being formed of cane splints exposing the enameled surface of the cane, substantially as before set forth.

3. A composite material for bottoms for chairs and other seats or articles of furniture, composed of a top layer of cane-cloth, exposing the enameled surface of the cane, and a backing of one or more layers of cane or wood splints, the several layers of the said composite material being glued or cemented together, substantially as before set forth.

In testimony that I claim the foregoing as my own I affix my signature in presence of two witnesses.

JOHN LEMMAN.

Witnesses:
JAS. B. F. THOMAS,
C. P. SAMPSON.